United States Patent
Suenaga et al.

(10) Patent No.: US 6,903,319 B2
(45) Date of Patent: Jun. 7, 2005

(54) METHOD AND APPARATUS FOR CONTROLLING ELECTRIC POWER FOR HIGH-FREQUENCY DIELECTRIC HEATING

(75) Inventors: Haruo Suenaga, Katano (JP); Kenji Yasui, Yamatokoriyama (JP); Yoshiaki Ishio, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

(21) Appl. No.: 10/465,122

(22) Filed: Jun. 19, 2003

(65) Prior Publication Data

US 2004/0074900 A1 Apr. 22, 2004

(30) Foreign Application Priority Data

Jun. 21, 2002 (JP) .................................... P. 2002-181905

(51) Int. Cl.[7] ................................................ H05B 6/66
(52) U.S. Cl. ....................................................... 219/715
(58) Field of Search ................................. 219/600, 626, 219/627, 665, 667, 678, 702, 715–718; 361/18, 71, 86, 100; 323/205, 277, 901; 315/208, 224, 247, 283; 363/49, 89, 18, 97, 124

(56) References Cited

U.S. PATENT DOCUMENTS

| 3,913,002 A | * | 10/1975 | Steigerwald et al. | ........ 315/208 |
| 4,065,802 A | * | 12/1977 | Mizukawa et al. | ......... 219/627 |
| 4,356,371 A | * | 10/1982 | Kiuchi et al. | ............... 219/626 |
| 4,556,770 A | * | 12/1985 | Tazima et al. | ............... 219/627 |
| 4,810,847 A | * | 3/1989 | Ito | ............................. 219/626 |

FOREIGN PATENT DOCUMENTS

JP 7-176375 7/1995

* cited by examiner

*Primary Examiner*—Tu Hoang
(74) *Attorney, Agent, or Firm*—Pearne & Gordon LLP

(57) ABSTRACT

A high-frequency dielectric heating power control method comprises: detecting the input current of an inverter circuit for rectifying the voltage of an AC power source to convert the rectified voltage into an AC voltage of a predetermined frequency; rectifying the detected current to determine an input current waveform; shaping the waveform to determine a reference waveform; determining the difference between the input current waveform and the reference waveform; and mixing the differential information and the current control output by a mix circuit to convert the mixed one into the drive output of a switching transistor of the inverter circuit.

21 Claims, 13 Drawing Sheets

PRIOR ART

A, B AND C: KINDS OF MAGNETRONS

METHOD AND APPARATUS FOR CONTROLLING ELECTRIC POWER FOR HIGH-FREQUENCY DIELECTRIC HEATING

BACKGROUND OF THE INVENTION

The present invention relates to a high-frequency dielectric heating using a magnetron as in a microwave cooker and, more particularly, to a high-frequency dielectric heating, which is not influenced by differences such as the fluctuation or kind of the characteristics of the magnetron or the temperature of the anode of the magnetron.

In the conventional high-frequency heating apparatus, the electric power to be fed to the magnetron is adjusted with the output pulse width of an inverter control circuit. As the output voltage of signal superposing means becomes the higher, the output pulse width of the inverter control circuit becomes the larger so that the power to be fed to the magnetron becomes the higher. By this construction, the output voltage of the signal superposing means can be changed to change the heating output of the magnetron continuously.

On the other hand, the heater acts as the cathode of the magnetron, and a transformer for feeding the power to the magnetron feeds the power to the heater, too. Therefore, the power to be fed to the heater changes with the change in the power to be fed to the magnetron. If the heater temperature is to be confined within a proper range, therefore, only a small changing width of the heating output can be taken to raise a problem that the heating output cannot be continuously changed.

A high-frequency heating apparatus capable of solving that problem has been proposed as a control system, for example, in JP-A-7-176375. FIG. 12 is a diagram for explaining a high-frequency heating apparatus to execute that control system. In FIG. 12, the heating control system is constructed to comprise; a magnetron 701; a transformer 703 for feeding a high-voltage power to a high-voltage rectifying circuit 702 to feed a secondary winding power to the magnetron 701 and for feeding the power to a heater 715 of the magnetron 701; an inverter circuit 705 for rectifying an AC power source 704 to convert the rectified one to an alternative current of a predetermined frequency thereby to feed the converted current to the transformer 703; power detecting means 706 for detecting the input power or the output power of the inverter circuit 705; an output setting unit 707 for outputting an output set signal corresponding to a desired heating output setting; a power adjusting unit 708 for comparing the output of the power detecting means 706 and the output set signal to control the DC level of a power adjusting signal to a desired heating output; transmission detecting means 719 for changing a transmission detection signal as its output from LO to HI when the output of the power detecting means 706 exceeds an output level 718 of reference voltage generating means; a comparison voltage generating circuit 716 for generating a voltage corresponding to the output set signal; a waveform shaping circuit 721 for shaping the waveform shaping signal, as compared with the output set signal by a level converting circuit 720, and the output of the shaping circuit 710 for shaping the AC power source voltage 704, on the basis of the waveform shaping signal and the transmission detection signal; a comparator circuit 711 for comparing the output signal of the waveform shaping circuit 721 with the output of the comparison voltage generating circuit, to output a comparison reference voltage, when the former is lower, but to invert and amplify the former when the same is higher; signal superposing means 712 for superposing a fluctuating signal of the output of the comparator circuit 711 over the power adjusting signal, to output a pulse width control signal; an oscillation circuit 713; and an inverter control circuit 714 for modulating the output of the oscillation circuit 713 in pulse width with the pulse width control signal, to drive the inverter circuit 705 with the modulated output.

The aforementioned high-frequency heating apparatus adjusts the power to be fed to the magnetron 701, with the width of the output pulse of the inverter control circuit 714. As the output voltage of the signal superposing means 712 becomes the higher, the output pulse width of the inverter control circuit 714 becomes the wider, and the power to be fed to the magnetron 701 becomes the higher. In this apparatus, the heating output of the magnetron 701 can be continuously changed by changing the output voltage of the signal superposing means 712 continuously.

According to this construction, the shaping is done according to the output setting by the waveform shaping circuit 721 which inputs the shaping voltage of the AC power source 704 and outputs it to the comparator circuit 711. The output of the waveform shaping circuit 721 is inverted and amplified by the comparator circuit 711, which has as the reference voltage the comparison voltage generating circuit 716 for generating the reference signal at the level corresponding to the heating output setting signal. This inverted and amplified signal and the output of the power adjusting unit 708 are superposed so that the pulse width control signal, i.e., the output signal of the signal superposing means 712 takes a lower level near the maximum amplitude of the AC power source 704 when the heating output is set low than when set high. The level of the unoscillation portion of the magnetron becomes the higher so that the transmission period of the magnetron for one power source period becomes the longer. As a result, the power to be fed to the heater is raised. At the high output time, moreover, the input current waveform of the inverter takes such a waveform approximate the rectified waveform of the sine wave as is convex near the envelope peak, so that the higher harmonic current is suppressed.

Thus, the pulse width control signal is so controlled by the waveform shaping circuit 721 that a more heater current may flow in at the low output time and that the higher harmonics of the power source current may become smaller at the high output time. Therefore, it is possible to suppress the higher harmonics of the power source current and to reduce the change in the heater current thereby to realize a highly reliable high-frequency heating apparatus.

In this control, however, the ON/OFF drive pulse of the switching transistor is subjected to a pulse width modulation using the modulation waveform which is processed/shaped from the commercial power source waveform so that the waveform shaping by the "estimated control system" is realized to make the input current waveform resemble the sine wave. Therefore, it has been found out that the waveform shaping cannot follow so far as the fluctuation in the dispersion or kind of the characteristics of the magnetron, the fluctuation in the temperature of the anode of the magnetron and in the ebm (i.e., the anode-cathode voltage) due to the load in the microwave cooker, or the fluctuation in the power source voltage.

Here will be briefly described the dispersion or kind of the characteristics of the magnetron, which has motivated the invention. The VAK (i.e, the anode-cathode voltage)-Ib characteristics of the magnetron are covered by a nonlinear load, as shown in FIGS. 13A, 13B and 13C. In response to the phase of the commercial power source, therefore, the ON width is modulated to bring the input current waveform close to the sine wave thereby to improve the power factor.

Moreover, the nonlinear characteristics of the magnetron are different depending on the kinds of the magnetron and are fluctuated by the magnetron temperature or the load in the microwave cooker.

FIGS. 13A, 13B and 13C are characteristic diagrams of an anode-cathode applied voltage—an anode current of the magnetron. FIG. 13A is a diagram showing the differences due to the kinds of magnetrons; FIG. 13B is a diagram showing the differences due to the matching grade of the power supply of the magnetron; and FIG. 13C is a diagram showing the differences due to the temperature of the magnetron. Throughout FIGS. 13A to 13C, moreover, the ordinates indicate the anode-cathode voltage, and the abscissas indicate the anode current.

In FIG. 13A, therefore, letters A, B and C plot the characteristics of three kinds of magnetrons. In the case of the magnetron A, an electric current as low as IA1 or less flows till the VAK becomes VAK1 (=ebm). When the VAK exceeds the VAK1, however, the current IA abruptly begins to increase. In this region, the current IA abruptly changes for a small difference of the VAK. Next, in the case of the magnetron B, the VAK2 (=ebm) is lower than the VAK1. In the case of the magnetron C, moreover, the VAK3 (=ebm) is far lower than the VAK2. Thus, these nonlinear characteristics of the magnetron are different for the kinds A, B and C. In the case of the modulated waveform according to the magnetron having the low ebm, therefore, the input current waveform is distorted when a magnetron having a high ebm is used. These problems cannot be solved by the device of the prior art. Therefore, it is a target to provide a high-frequency dielectric heating circuit which is not subject to those influences of the kinds.

Turning to FIG. 13B, the characteristic diagrams of the three kinds of magnetrons show the impedance matching qualities of the heating chamber, as viewed from the magnetrons. In the case of a good impedance matching, the VAK1 (=ebm) takes the maximum and becomes the lower as the matching becomes the poorer. Thus, these nonlinear characteristics of the magnetron are seriously different for the impedance matching quality. Therefore, it is a target to provide a high-frequency dielectric heating circuit, which is not subject to those influences of the kinds.

Turning to FIG. 13C, the characteristic diagrams of the three kinds of magnetrons show the levels of the temperature of the magnetrons. In the case of a low temperature, the VAK1 (=ebm) takes the maximum and becomes the lower as the temperature becomes the higher. If the characteristics are adjusted to the lower temperature of the magnetron, therefore, the input voltage waveform is distorted when the temperature of the magnetron becomes high.

Thus, the nonlinear characteristics of the magnetron are seriously different for the difference in the temperature of the magnetron. Therefore, it is a target to provide a high-frequency dielectric heating circuit, which is not subject to those influences of the kinds.

Moreover, these fluctuations are not compensated in the circuit of the prior art and in the aforementioned circuit.

SUMMARY OF THE INVENTION

Therefore, an object of the invention is to provide a high-frequency dielectric heating method and a device therefor, which is influenced neither by a dispersion, if any in the kind or characteristics of a magnetron, by a fluctuation, if any in the ebm (i.e., the anode-cathode voltage) due to the temperature of the anode of the magnetron or the load in the microwave cooker, nor by a fluctuation, if any in the power source voltage.

In order to achieve the above-specified object, according to first aspect of the invention, there is provided a high-frequency dielectric heating power control method comprising the steps of: detecting the input current of an inverter circuit for rectifying an AC power source voltage for a high-frequency switching to convert the rectified voltage into a high-frequency power, thereby to determine an input current waveform; determining a reference waveform from the AC power source voltage waveform; determining a difference between the input current waveform and the reference waveform; and mixing the differential information and a power control output to convert the mixed one into a drive signal of a switching transistor of the inverter circuit According to second aspect of the invention, there is provided a high-frequency dielectric heating power control method comprising the steps of: detecting the input current of an inverter circuit for rectifying an AC power source voltage for a high-frequency switching to convert the rectified voltage into a high-frequency power; rectifying the detected current to determine an input current waveform; rectifying the AC power source voltage and shaping the waveform to determine a reference waveform; determining a difference between the input current waveform and the reference waveform; and mixing the differential information and a power control output by a mix circuit to convert the mixed one into a drive output of a switching transistor of the inverter circuit.

In a high-frequency dielectric heating power control method according to first or second aspect of the invention, the reference waveform is obtained by converting a commercial power source voltage waveform through a gain-variable amplifier.

In a high-frequency dielectric heating power control method, the differential information between the reference waveform and the input current waveform is used as a control input signal of the gain-variable amplifier.

In a high-frequency dielectric heating power control method, the mix circuit is constructed to cut the high-frequency component of the current control output.

In a high-frequency dielectric heating power control method, the signal, which is shaped by rectifying the AC power source voltage and by inverting the shaped waveform, is inputted as an auxiliary modulation signal to the mix circuit.

In a high-frequency dielectric heating power control method, a limiter for limiting the differential information in a plus direction and in a minus direction is provided to input the mix circuit.

In a high-frequency dielectric heating power control method, the current error signal, i.e., the difference between the value smoothed from the input current waveform and a current reference signal is given a difference between its current rising and falling characteristics.

In a high-frequency dielectric heating power control method, a limiter function to control the collector voltage of the switching transistor to a predetermined value is added to the current control output.

In a high-frequency dielectric heating power control method, the high-frequency component of the differential information is cut to a control input signal of a gain-variable amplifier.

In a high-frequency dielectric heating power control method, reference signal converting means is provided for approaching the reference waveform signal to zero in the phase wherethe AC power source voltage is low.

In a high-frequency dielectric heating power control method, a shaping filter circuit for rectifying the AC power source voltage is provided with a filter for attenuating the higher harmonic distortion component of the commercial power source frequency.

In a high-frequency dielectric heating power control method, the phase of the reference waveform is advanced in advance by considering the delay time of a control system.

According to another aspect the invention, there is provided a high-frequency dielectric heating power control device comprising: current detecting means for rectifying an AC power source voltage for a high-frequency switching to convert the rectified voltage into a high-frequency power; first waveform converting means for converting the output of the current detecting means into an input current waveform signal; second waveform converting means for converting the AC power source voltage into a reference waveform signal; a waveform error detecting circuit for determining a difference between the input current waveform signal from the first waveform converting means and the reference waveform signal from the second waveform converting means, to output a waveform error signal; and drive signal converting means for mixing the waveform error signal and a power control output to convert the mixed one into the drive signal of a switching transistor of the inverter circuit.

Furthermore, according to the invention, there is provided a high-frequency dielectric heating power control device comprising: current detecting means for rectifying an AC power source voltage for a high-frequency switching to convert the rectified voltage into a high-frequency power; a first rectifying circuit for rectifying a current signal from the current detecting means; a second rectifying circuit for rectifying the AC power source voltage; a shaping circuit for shaping the waveform of the output of the second rectifying circuit; a gain-variable amplifier circuit for varying the gain of the output signal from the shaping circuit, to output a reference waveform signal; and a waveform error detecting circuit for outputting a waveform error signal from a difference between the input current waveform signal from the first shaping circuit and the reference waveform signal from the gain-variable amplifier circuit.

Figure 3A:
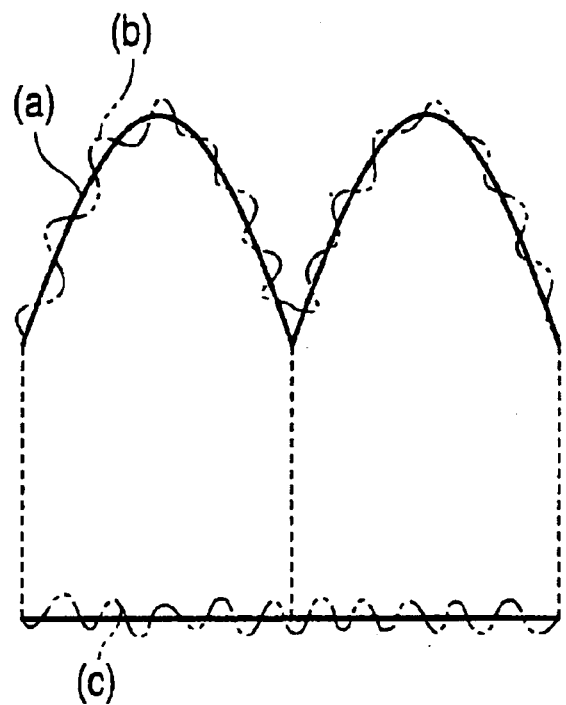
Figure 3B:
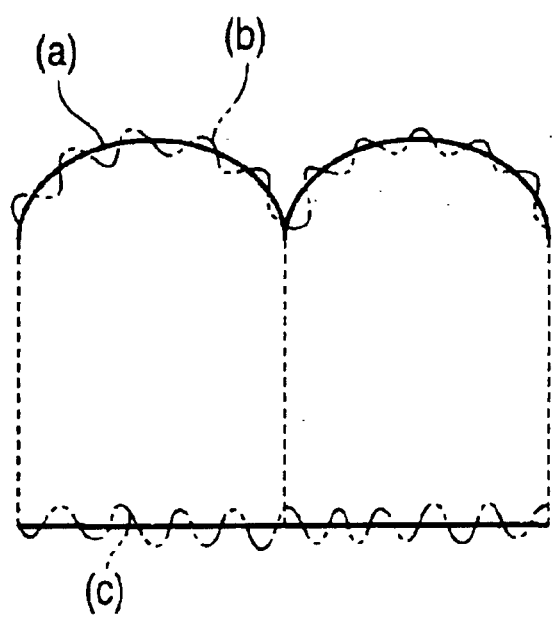
Figure 4:
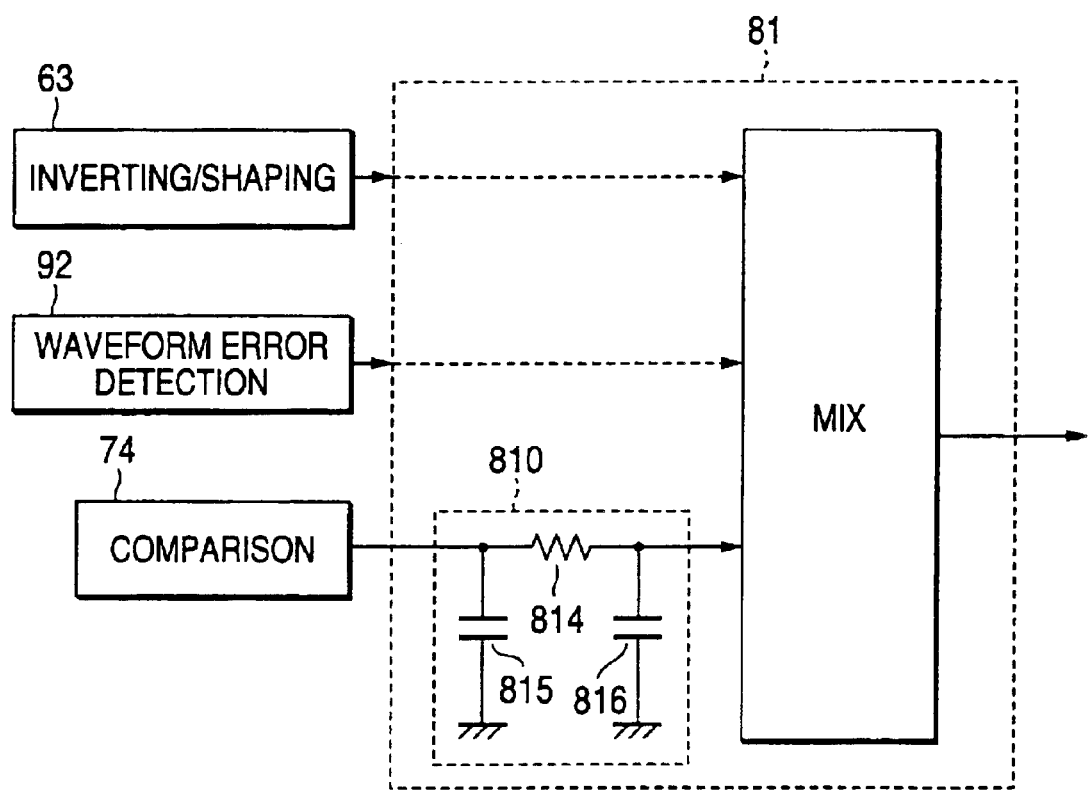
Figure 5A:
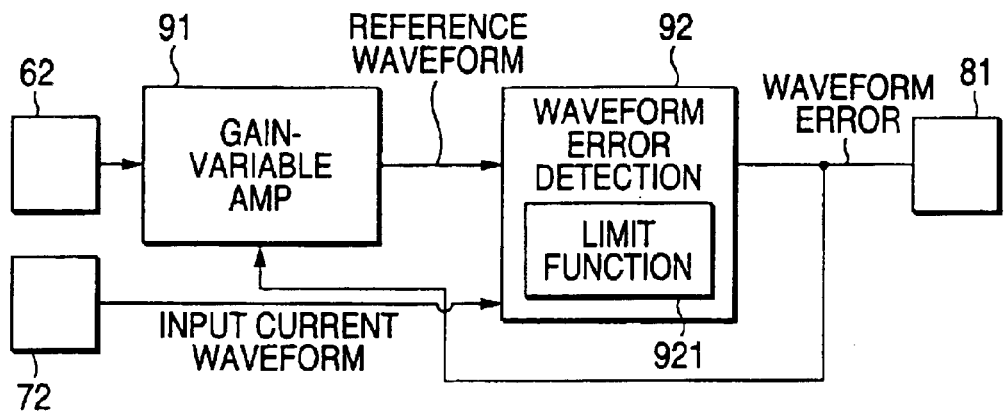
Figure 5B:
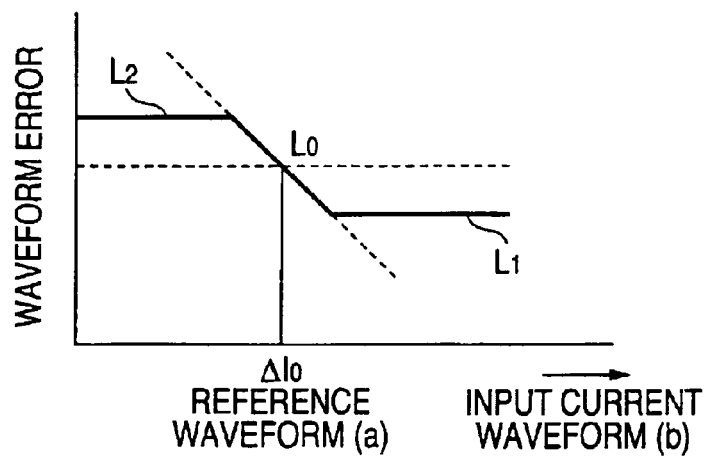
Figure 5C:
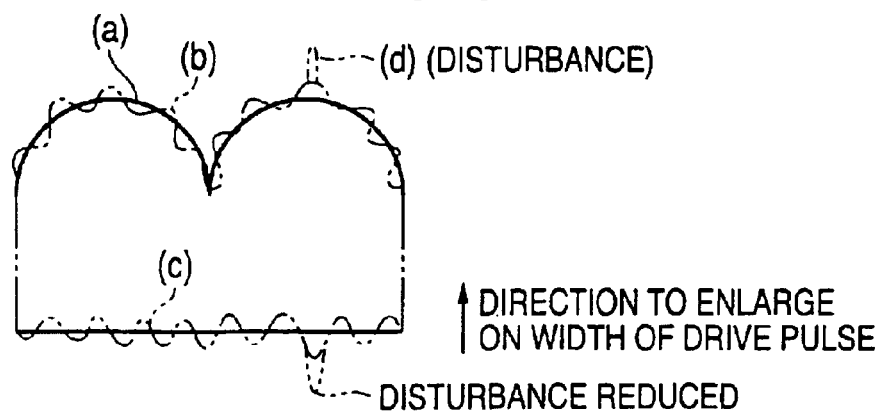
Figure 6A:
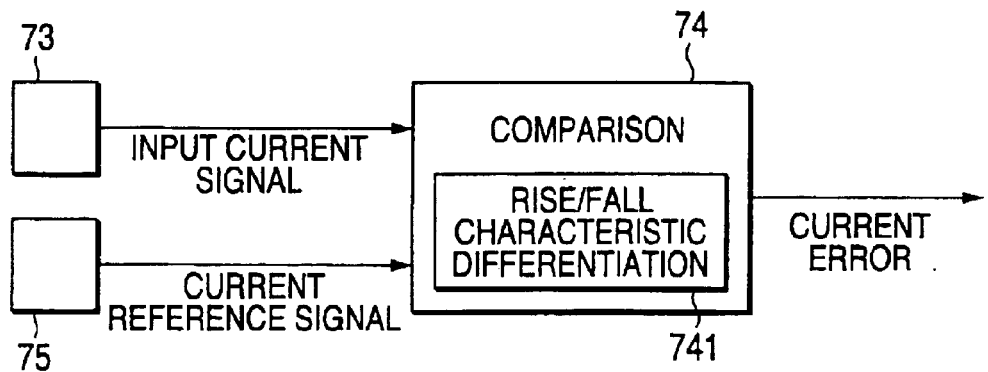
Figure 6B:
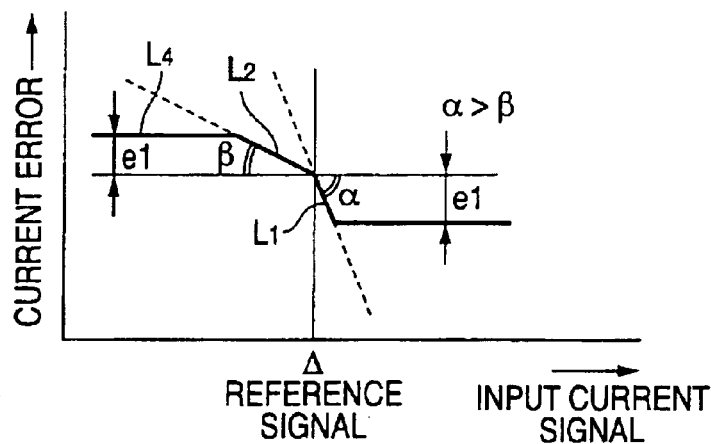
Figure 6C:
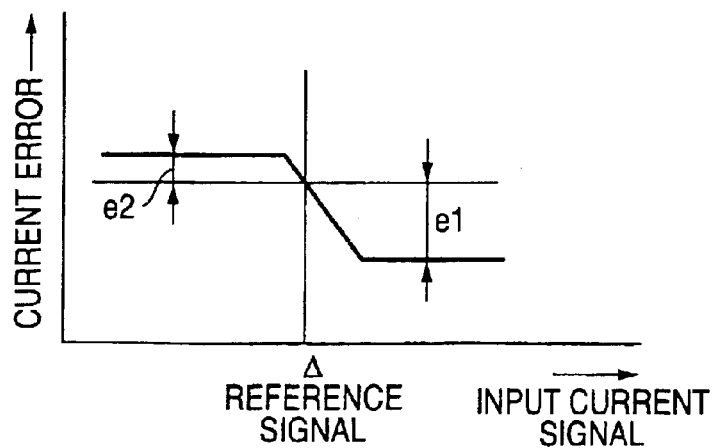
Figure 7A:
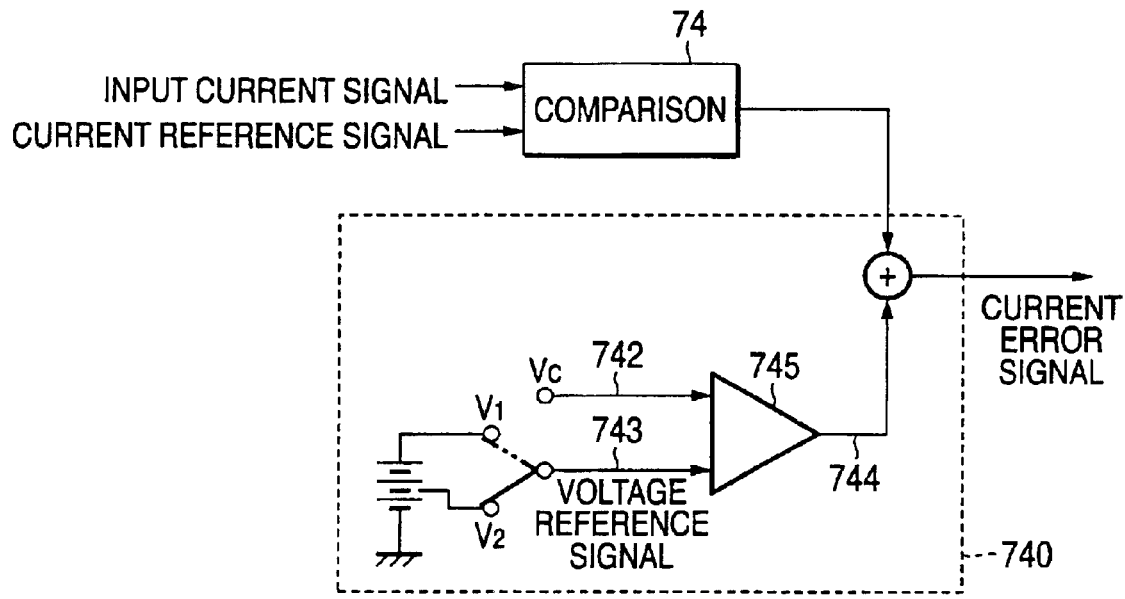
Figure 7B:
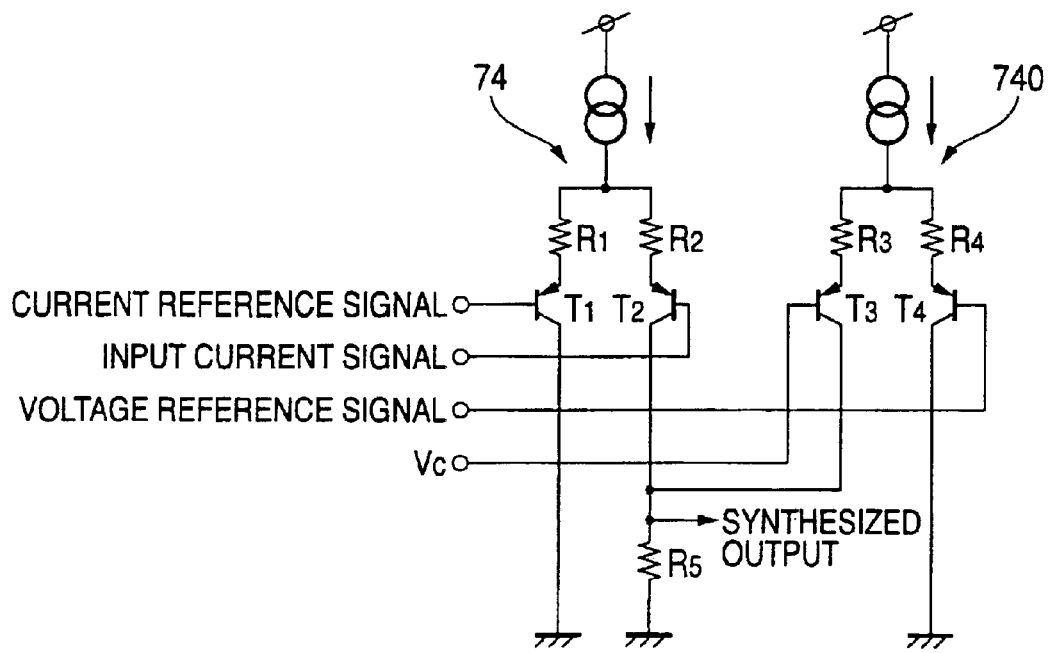
Figure 8A:
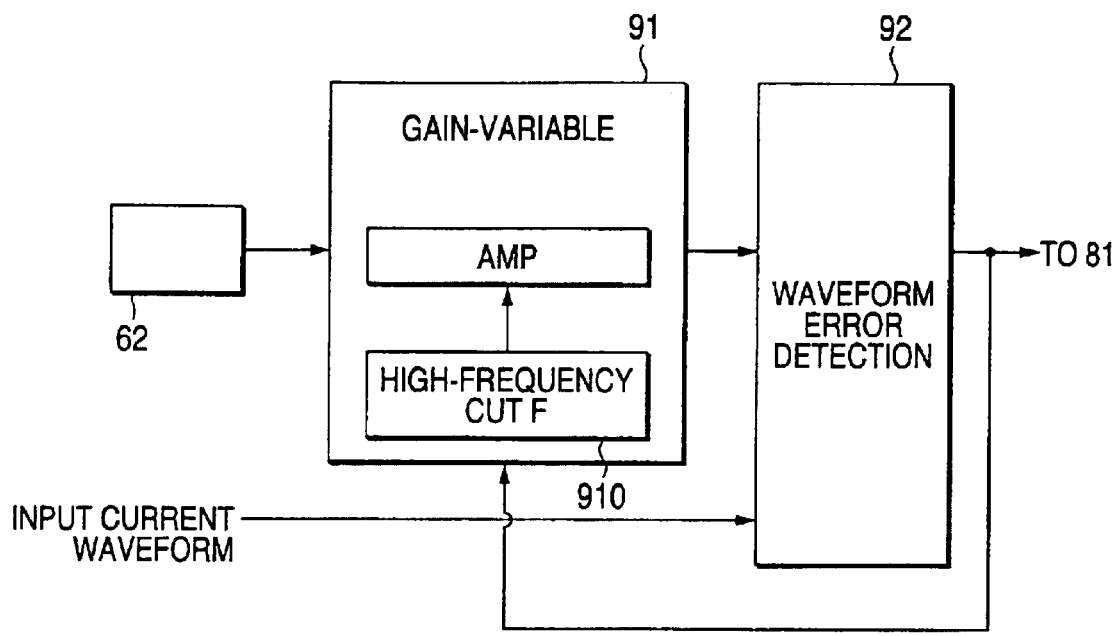
Figure 8B:
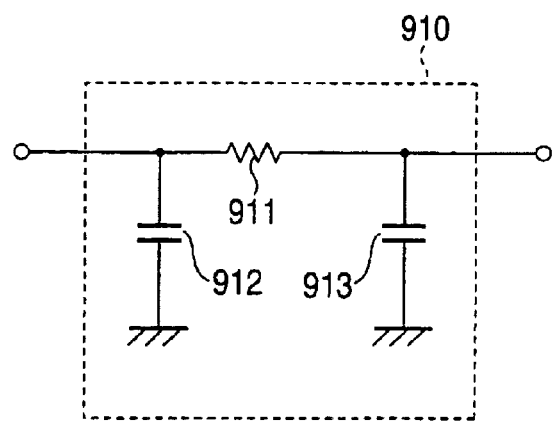
Figure 9A:
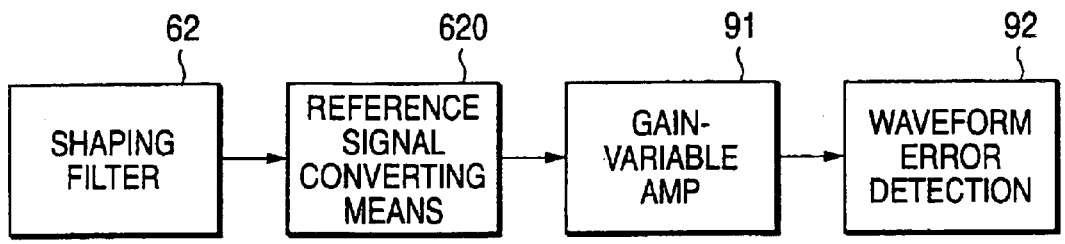
Figure 9B:
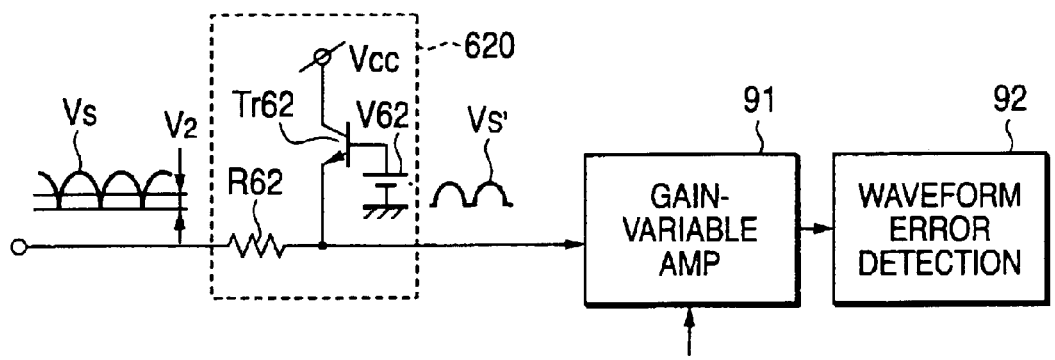
Figure 9C:
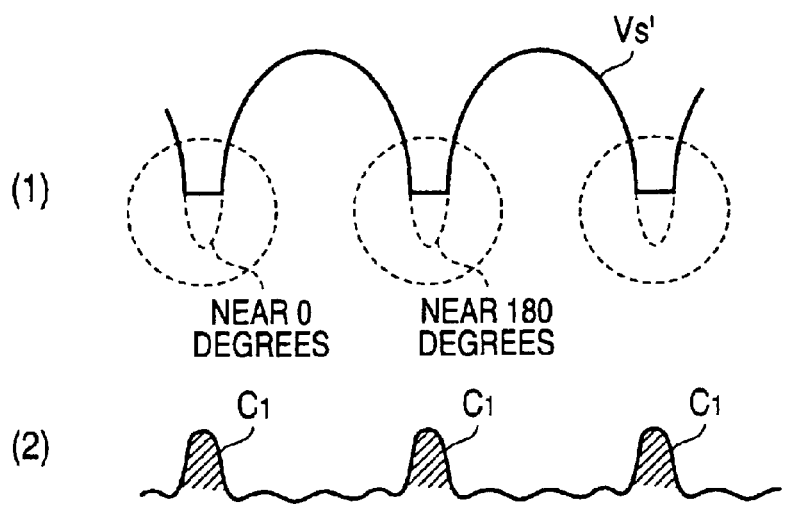
Figure 10A:
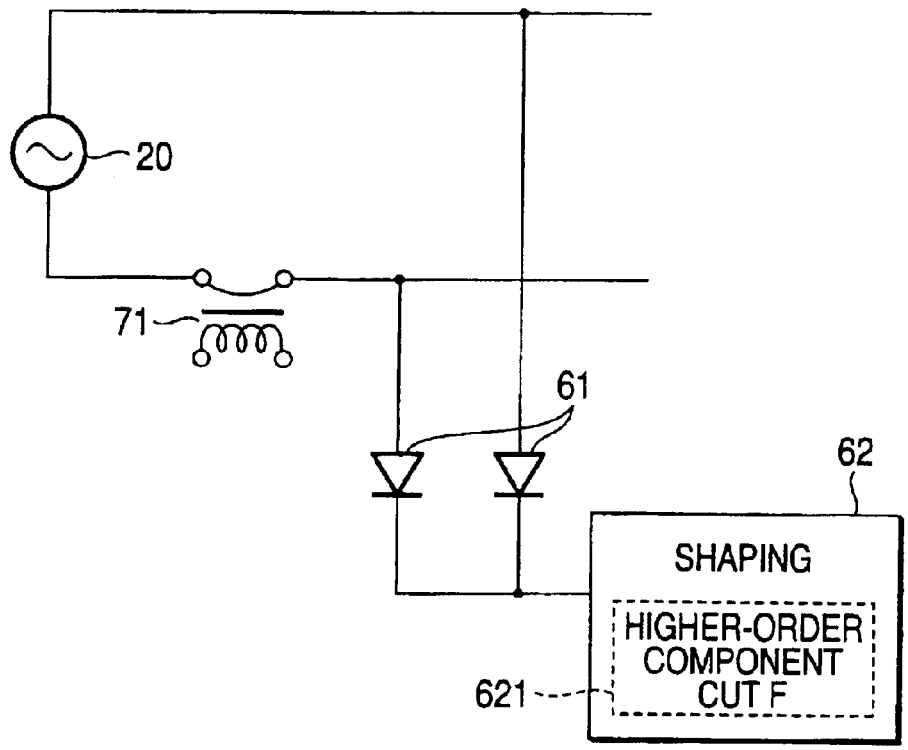
Figure 10B:
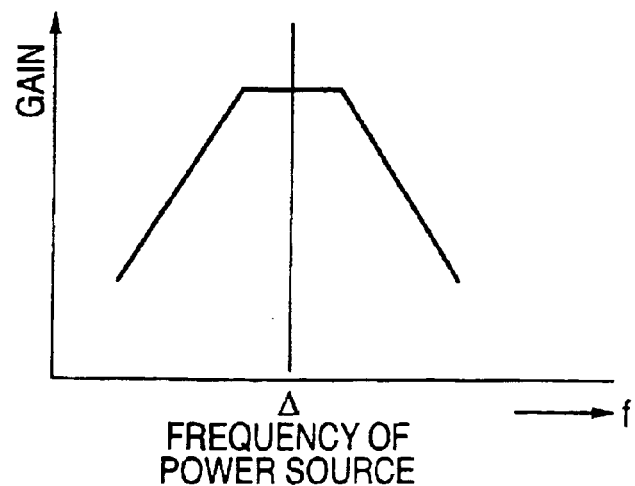
Figure 11A:
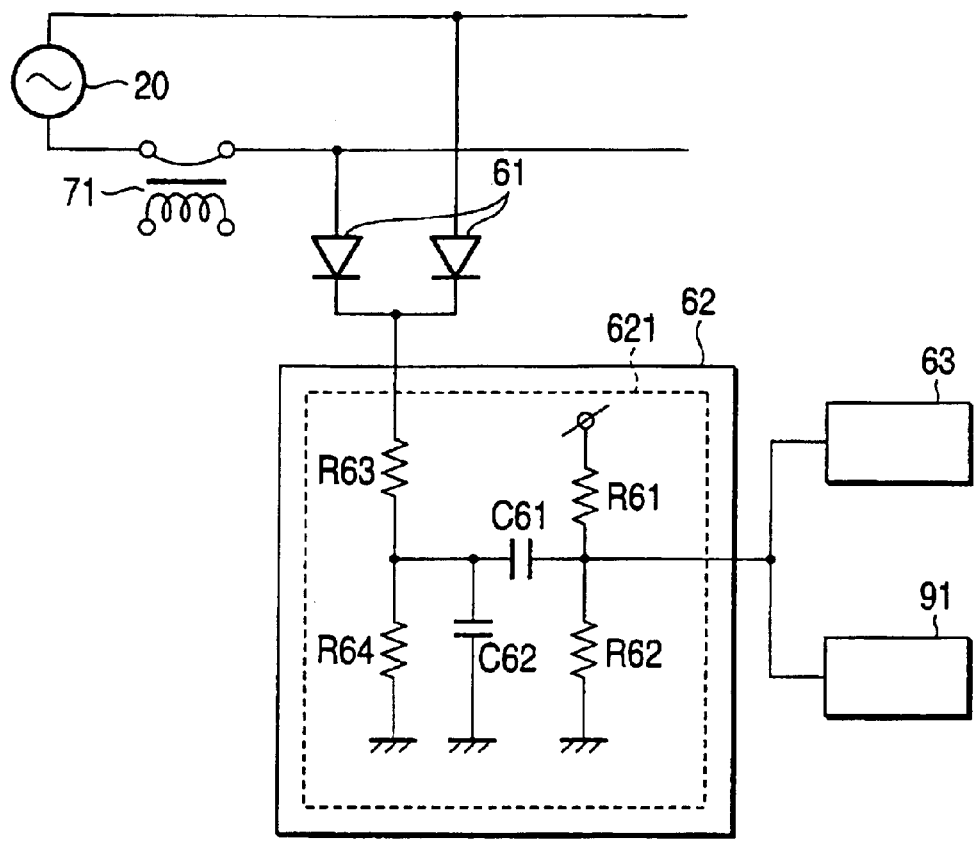
Figure 11B:
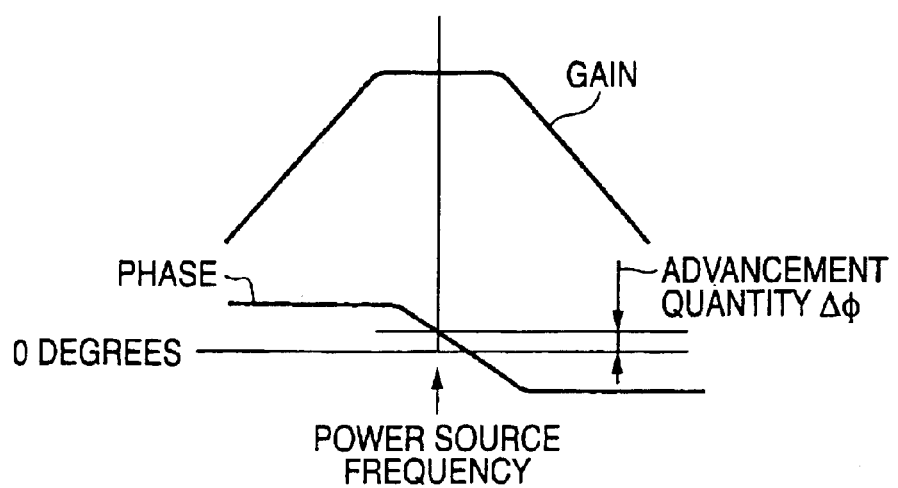
Figure 12:
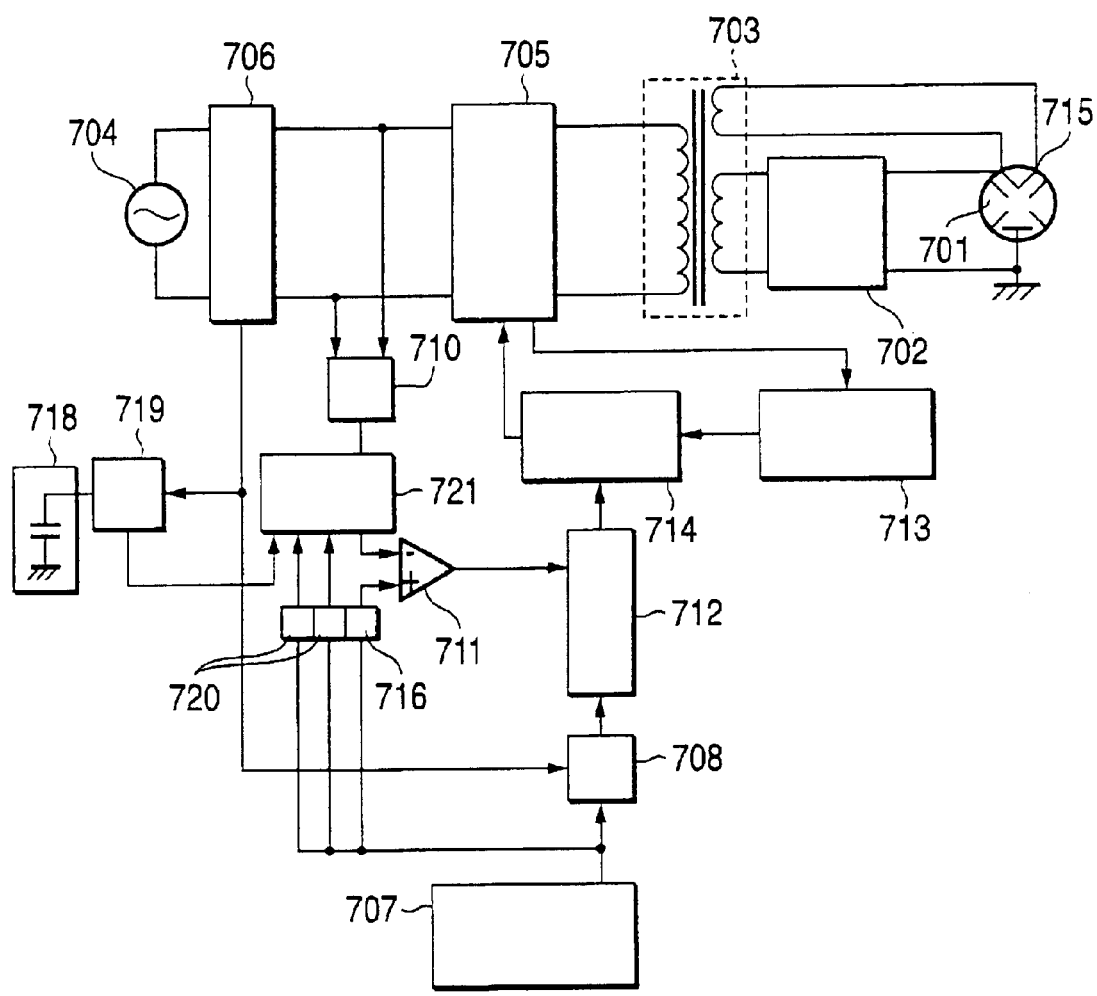
Figure 13A:
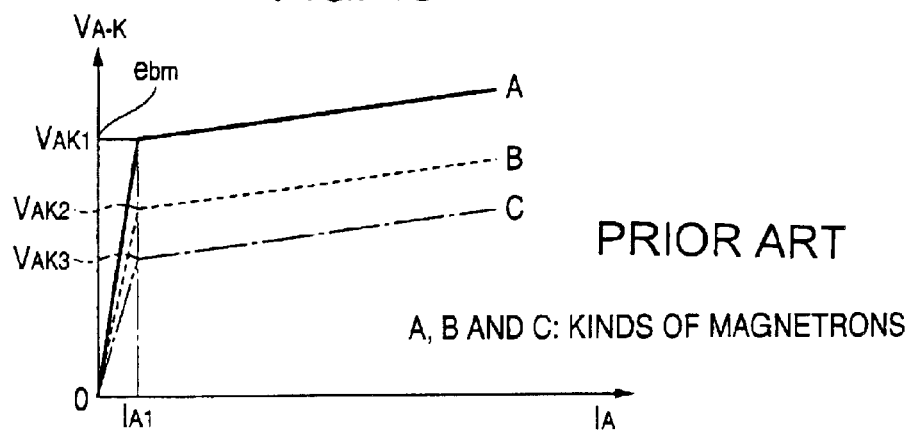
Figure 13B:
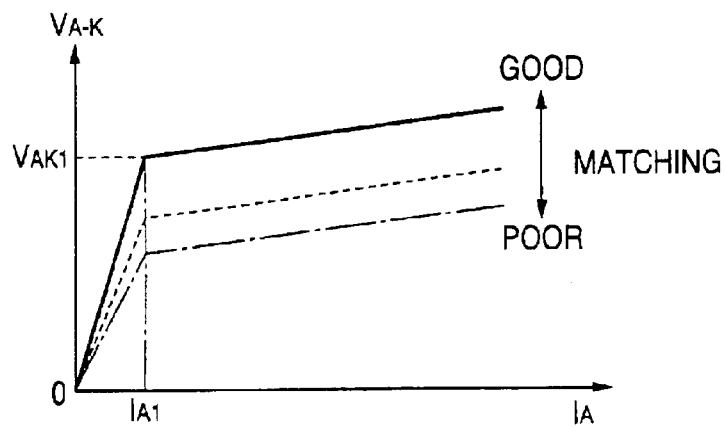
Figure 13C:
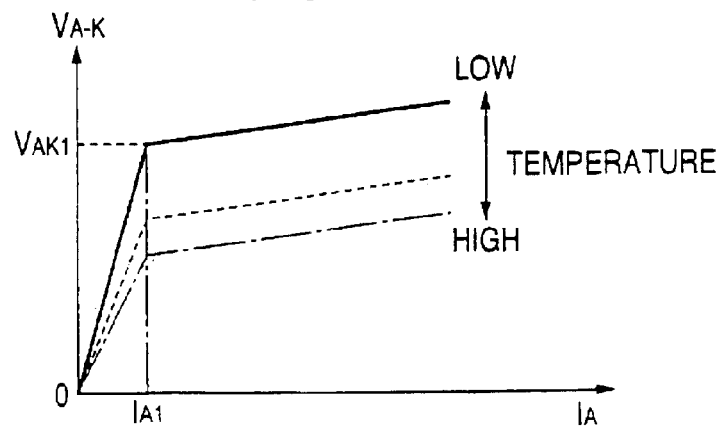

Of FIGS. 3A and 3B for explaining waveforms obtained according to Embodiment of the invention, FIG. 3A corresponds to a case of a high input current, and FIG. 3B corresponds to a case of a low input current;

FIG. 4 shows a circuit of the construction according to Embodiment 4 of the invention, in which a high-frequency component is cut;

Of FIGS. 5A, 5B and 5C for explaining Embodiment 6 of the invention: FIG. 5A is a block diagram; FIG. 5B is a characteristic diagram; and FIG. 5C a waveform diagram;

Of FIGS. 6A, 6B and 6C for explaining a method according to Embodiment 7 of the invention to make a difference in current rise/fall characteristics; FIG. 6A is a block diagram; FIG. 6B is a first characteristic diagram; and FIG. 6C is a second characteristic diagram;

Of FIGS. 7A and 7B for explaining such a construction according to Embodiment 8 of the invention as to add a Vc limiter function to a current control output, FIG. 7A is a construction diagram, and FIG. 7B shows a specific circuit example;

Of FIGS. 8A and 8B for explaining Embodiment 9 of the invention, FIG. 8A is a block diagram, and FIG. 8B shows one example of a high-frequency component cut filter 910 of FIG. 8B;

Of FIGS. 9A, 9B and 9C for explaining a reference signal converting circuit to be used in Embodiment 10 of the invention: FIG. 9A is a block diagram; FIG. 9B shows one example of the reference signal converting circuit of FIG. 9A; and FIG. 9C is a waveform diagram, in which (1) shows a reference waveform and (2) shows a waveform error signal;

Of FIGS. 10A and 10B for explaining Embodiment 11 of the invention, FIG. 10A is a circuit diagram, and FIG. 10B is a gain-frequency characteristic diagram;

Of FIGS. 11A and 11B for explaining Embodiment 12 of the invention, FIG. 11A is a circuit diagram, and FIG. 11B is a diagram for explaining a phase advancement of the reference waveform;

FIG. 12 is a diagram for explaining a high-frequency heating apparatus for practicing the control system, which has been applied for patent by the common applicant; and Of FIGS. 13A, 13B and 13C presenting characteristic diagrams of an anode-cathode applied voltage—an anode current of a magnetron: FIG. 13A is a diagram showing the kinds of magnetrons; FIG. 13B is a diagram showing a power supply matching; and FIG. 13C is a diagram showing the temperature of the magnetron.

DESCRIPTION OF THE PREFERRED EMBODIMENTS

The present invention will be described with reference to the accompanying drawings.

Figure 1:
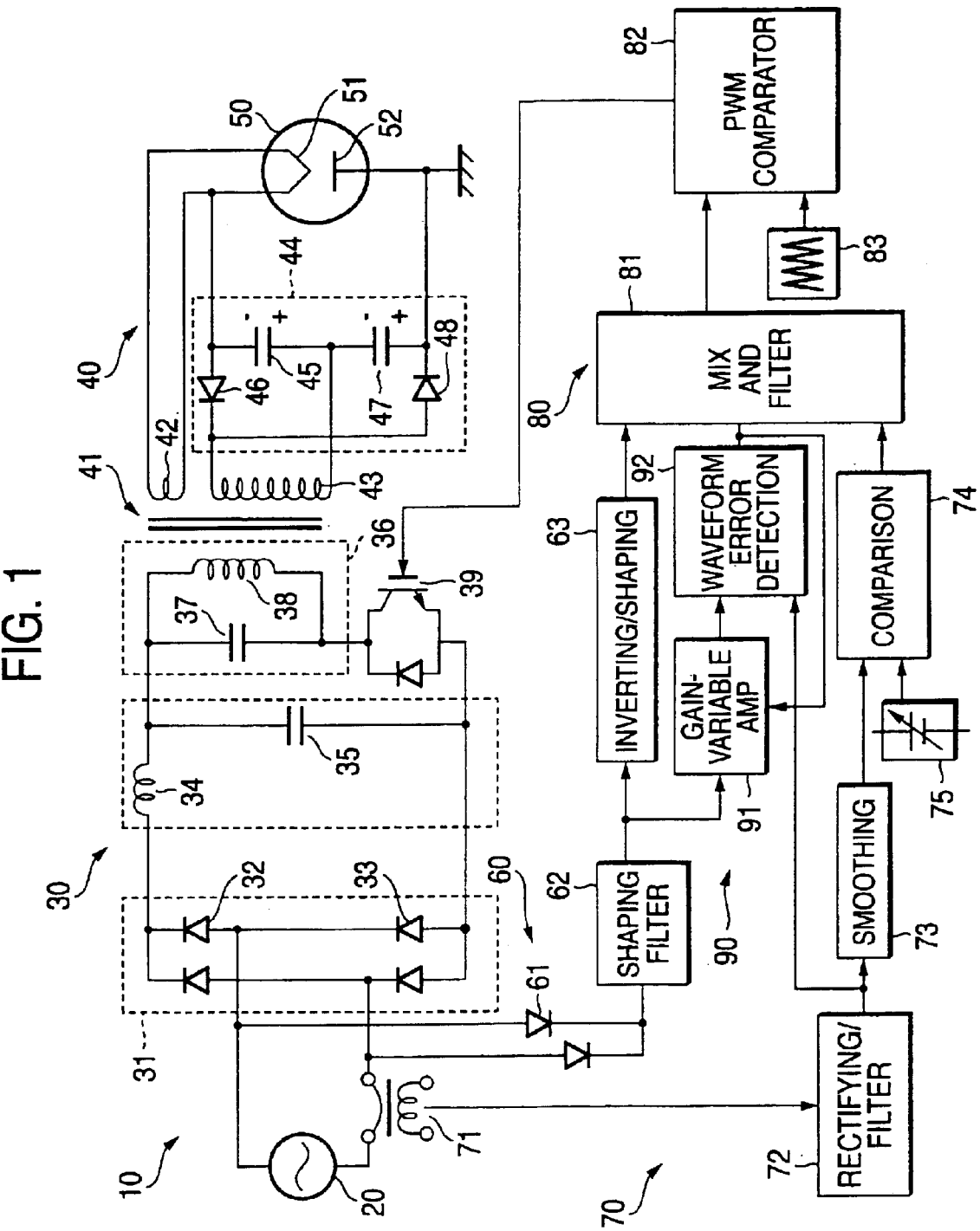
FIG. 1 is a construction diagram of a magnetron drive power source, at which the invention aims.

FIG. 1 is a diagram for explaining a high-frequency heating apparatus according to the invention.

In FIG. 1, the AC voltage of an AC power source 20 is rectified by a diode bridge type rectifier circuit 31 composed of four diodes 32 and is converted into a DC voltage through a smoothing circuit 30 composed of an inductor 34 and a capacitor 35. After this, the DC voltage is converted into a high-frequency AC current by an inverter circuit, which includes a resonance circuit 36 composed of a capacitor 37 and the primary winding 38 of a transformer 41 and a switching transistor 39, so that a high-frequency high-voltage is induced at the secondary winding 43 of the transformer 41.

The high-frequency high voltage induced at the secondary winding 43 is applied between the anode 52 and the cathode 51 of a magnetron 50 through a voltage doubler rectifier circuit 44, which is composed of a capacitor 45, a diode 46, a capacitor 47 and a diode 48. On the other hand, the transformer 41 is provided with a tertiary winding 42, by which the heater (or cathode) 51 of the magnetron 50 is heated. The components thus recited constitute an inverter main circuit 40.

Here will be described a control circuit 70 for controlling the switching transistor 39 of the inverter. At first, the input current of the inverter circuit is detected by current detecting means 71 such as a CT, and the current signal from the current detecting means 71 is rectified by a rectifier circuit 72 and is smoothed by a smoothing circuit. This smoothed current signal is compared by a comparator circuit 74 with an output setting signal corresponding to the other heating output setting and coming from an output setting unit 75. Here, the comparator circuit 74 performs comparisons for controlling the magnitude of an electric power. Therefore, the invention is effective, even if the aforementioned input current signal is replaced by another input signal such as the anode current signal of the magnetron 50 or the collector current signal.

As shown at reference numeral 60, on the other hand, the AC power source 20 is rectified by a diode 61, and its waveform is shaped by a shaping circuit 62. After this, the signal from the shaping circuit 62 is inverted and shaped in its waveform by an inverting/shaping circuit 63.

As shown at reference numeral 90, the output signal from the shaping circuit 62 is made variable by the later-described gain-variable amplifier circuit 91 provided according to the invention, and a reference current waveform signal is outputted. The difference between the input current waveform signal from the rectifier circuit 72 and the reference waveform signal from that gain-variable amplifier circuit 91 is outputted as a waveform error signal by a waveform error detecting circuit 92 also provided according to the invention.

As shown at reference numeral 80, a mix and filter circuit 81 (as will be shortly referred to as the "mix circuit") mixes and filters the waveform signal from the waveform error detecting circuit 92 and the current error signal from the comparator circuit 74, and outputs an ON voltage signal. This ON voltage signal is compared by a PWM comparator 82 with a saw tooth wave coming from a saw-tooth wave generating circuit 83 and is modulated in pulse width thereby to turn ON/OFF the switching transistor 39 of the inverter circuit.

Figure 2:
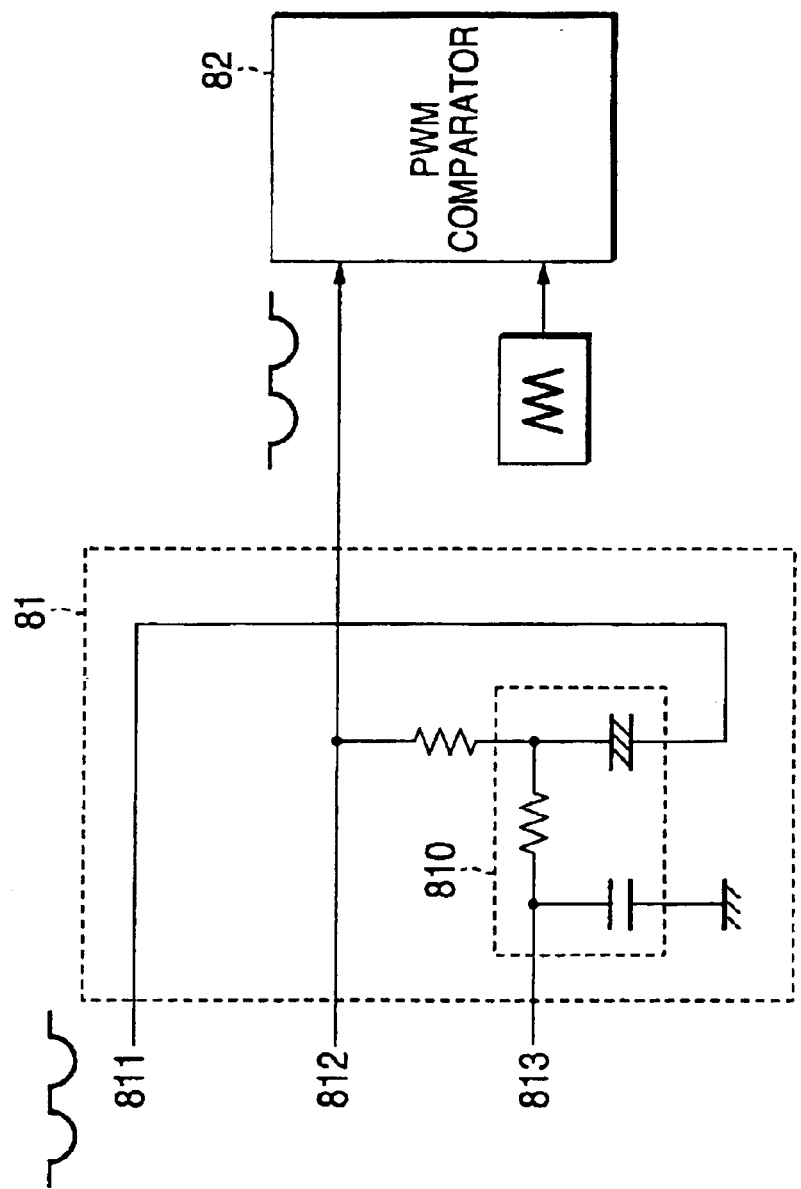
FIG. 2 is a circuit diagram showing one example of a mix circuit 81 of FIG. 1.

FIG. 2 shows one example of the mix circuit 81. This mix circuit 81 is provided with three input terminals 811, 812 and 813. An auxiliary modulation signal, the waveform error signal and the current error signal are applied to the terminals 811, 812 and 813, respectively, and are mixed by the shown internal circuit.

Reference numeral 810 designates a high-frequency cut filter, which filters out the unnecessary high-frequency component of the current error signal, as will be described hereinafter. This is because the fluctuation of the waveform error signal is not clear when the high-frequency component, if any, is mixed with the waveform error signal.

(Embodiment 1)

In Embodiment 1 of the invention, as has been described hereinbefore, the waveform reference following the magnitude of the input current is automatically prepared by the gain-variable amplifier circuit 91. This waveform reference is compared by the waveform error detecting circuit 92 with the input current waveform obtained from the current detecting means 71, thereby to produce the waveform error information. This waveform error information obtained is mixed with the output of the input current control and is used for conversions into the ON/OFF drive signal of the switching transistor 39 of the inverter circuit.

FIGS. 3A and 3B are diagrams for explaining the waveforms obtained by Embodiment 1 of the invention. FIG. 3A corresponds to the case in which the input current is high, and FIG. 3B corresponds to the case in which the input current is low. Moreover, shown curves are input signals (of which reference letter "a" indicates a reference current waveform, and reference letter "b" indicates an input current waveform) of the waveform error detecting circuit 92 and an output signal (of which reference letter "c" indicates a waveform error), respectively. As shown, the reference waveform changes in magnitude in accordance with the input current. No matter whether the input current might be high (FIG. 3A) or low (FIG. 3B), therefore, the output signal (the waveform error) of the waveform error detecting circuit 92 appears only as its waveform error, as shown at ("c"), so that the dynamic range of the waveform error detecting circuit 92 for generating the waveform error signal can always be kept so wide as to improve the characteristics.

Thus, the control loop acts such that the input current waveform, accords to the waveform reference following the magnitude of the input current. Even if the kinds or characteristics of the magnetron might disperse or with the fluctuations in the temperature of the anode of the magnetron, if the ebm (i.e., the anode-cathode voltage) might fluctuate due to the temperature of the anode of the magnetron or the load in the microwave cooker or if the power source voltage might fluctuate, therefore, it is possible to shape the input current waveform without any of those influences.

(Embodiment 2)

As has been described hereinbefore, Embodiment 2 of the invention converts the commercial power source voltage waveform into the reference waveform through the gain-variable amplifier circuit 91 so that the power factor becomes the best. Specifically, the reference current signal waveform is formed by rectifying the commercial power source voltage, so that the reference current signal waveform resembles closely a sine wave if the commercial power source voltage resembles the sine wave. On the other hand, the commercial power source voltage is generally accompanied by a waveform distortion (as especially exemplified by a collapse of the peak of the sine wave), but the reference current signal waveform then likewise collapses. In either case, therefore, the waveform is owned by the reference current signal waveform and is resembled by the input current waveform so that the power factor is improved independently of the power source circumstances. Conventionally, on the contrary, there is generally used the system, in which the reference voltage is generated by a microcomputer or the like. However, this system is seriously defective in that it cannot cope with the distortion of the power source voltage.

(Embodiment 3)

In Embodiment 3, the aforementioned differential information is fed back to the gain-variable amplifier circuit 91. As has been described hereinbefore, the reference waveform is obtained by converting the commercial power source voltage waveform through the gain-variable amplifier circuit 91. By feeding back the differential information between the reference wave form and the current waveform as the amplifier control input signal of the gain-variable amplifier circuit 91 to this gain-variable amplifier circuit 91, moreover, the reference waveform is enabled to follow the current waveform automatically in magnitude. Therefore, only the waveform error appears in the differential information so that the dynamic range of the waveform error detecting circuit 92 is kept wide to improve the characteristics.

(Embodiment 4)

In Embodiment 4 of the invention, the aforementioned mix circuit 81 is constructed to cut the high-range component of the current control output. FIG. 4 shows a circuit of one example. The numeral 810 designates the high-frequency component cut filter, which is inserted into the terminal for fetching the current error signal from the comparator 74. The high-frequency component cut filter 810 is constructed, for example, of such a π type filter as has a resistor 814 interposed between capacitors 815 and 816, as shown, Thus, the current error signal from the comparator 74 is cleared of the high-frequency component so that the waveform shaping is not adversely influenced by the noise of the current error signal thereby to improve the waveform.

(Embodiment 5)

In Embodiment 5 of the invention, the output signal of the aforementioned inverting/shaping circuit 63 is inputted as the auxiliary modulation signal to the mix circuit 81. Without this input, moreover, the dynamic range of the waveform error detecting circuit 92 is liable to become short. For coarse modulations using the modulation signal from the inverting/shaping circuit 63 as the auxiliary modulation signal, however, the waveform error detecting circuit 92 can perform the fine waveform shaping thereby to improve the precision.

(Embodiment 6)

In Embodiment 6 of the invention, a limiter for limiting the differential information of the aforementioned waveform error detecting circuit 92 in a plus direction or in a minus direction is provided for input to the mix circuit 81 FIGS. 5A to 5C are diagrams for explaining this embodiment FIG. 5A is a block diagram; FIG. 5B is a characteristic diagram; and FIG. 5C is a waveform diagram. In FIG. 5A, the limit function 921 is disposed in the waveform error detecting circuit 92 according to this embodiment. The reference waveform from the gain-variable amplifier circuit 91 and the input current waveform from the rectifying circuit 72 are outputted, when fed to the input of the waveform error detecting circuit 92, to the waveform error mix circuit 81 through that limit function 921.

In FIG. 5B, the ordinate indicates the waveform error value, and the abscissa indicates the input current waveform. A reference waveform is added to IO of the abscissa. In the error detection characteristics, a segment L0 of a negative gradient is centered by IO. Across the segment L0, there are limit straight lines L1 and L2 according to this embodiment for limiting the waveform errors at a predetermined level.

In FIG. 5C, a letter "a" indicates a reference waveform, and letter "b" indicates an input current waveform. Letter "d" is assumed to be a disturbance and letter "c" indicates an output signal representing an error waveform. The waveforms "a" and "b" are applied to the abscissa, and the waveform "c" is the waveform error signal to appear on the ordinate. When the reference waveform "a" is applied to the abscissa IO of FIG. 5B, the input current waveform "b" is deflected rightward of the drawing, if higher, and leftward of the drawing, if lower, and extends vertically upward from the deflection position so far that the intersection with the error detection characteristic curve L0 gives the waveform error value. Therefore, the input current waveform "b" intersects, if excessively high, with the error detection characteristic curve L1 so that the waveform error is limited.

The input current waveform "b" also intersects, if excessively low, with the error detection characteristic curve L2 so that the waveform is limited.

Therefore, the disturbance having invaded the input current waveform "b" is limited in waveform by the limit function so that its influences on the waveform error are reduced.

It is empirically known that the limit value is almost exceeded by the error signal. Therefore, the entrance of the disturbance into the control system raises a problem so that the influences of the disturbance can be reduced by this embodiment.

Moreover, the circuit can be prevented from being saturated to become unstable in actions, and the gain for few errors can be increased, so that the input current waveform follows the reference waveform. It is, therefore, possible to provide a secondary effect to improve the power factor.

(Embodiment 7)

In Embodiment 7 of the invention, the current error signal is given a difference in the current rise/fall characteristics. For making the current rise/fall characteristics, there are a method (1) for making a difference in the gradient and a method (2) for making a difference in the limit value.

FIGS. 6A, 6B and 6C are diagrams for explaining the method according to this embodiment for making the difference in the current rise/fall characteristics. FIG. 6A is a block diagram; FIG. 6B is a first characteristic diagram; and FIG. 6C is a second characteristic diagram.

In FIG. 6A, reference numeral 741 designates a rise/fall characteristic difference differentiating circuit disposed in the comparator circuit 74 in accordance with this embodiment. When the input current signal from the smoothing circuit 73 and the reference signal from the output setting unit 75 are fed to the input side of the comparator circuit 74, the current error is outputted to the mix circuit 81 through that rise/fall characteristic differentiating circuit 741.

In FIG. 6B, the ordinate indicates the current error value, and the abscissa indicates the input current signal. The reference signal is applied to the IO of the abscissa. Moreover, this embodiment is characterized: in that $\alpha > \beta$ (also $\alpha = \beta$ in the conventional art) if the gradient of the segment L1 on the right side (where the input current is higher than the reference signal) of the reference signal IO is designated by a and if the gradient of the segment L2 on the left side (where the input current is lower than the reference signal) is designated by $\beta$; and in that the error detection is limited like characteristics L3 and L4 for a difference of e1 between $\alpha$ and $\beta$.

As a result, a high error signal is obtained according to a when a higher input current signal than the reference signal IO comes, so that the control is accelerated. When a lower input current signal than the reference signal IO comes, on the other hand, a lower error signal is obtained according to $\beta$, so that the control is decelerated. Thus, a hunting (or fluctuation) hardly occurs.

According to this embodiment, as described above, a quick control is made for avoiding a danger when the input current is over the reference, but is not made because of no danger when the input current is under the reference, so that the hunting trouble, as might otherwise be caused by the quick response, can be reduced.

(Modification of Embodiment 7)

FIG. 6C is a second characteristic diagram for explaining the method for making a difference in the limit value. In FIG. 6C, the ordinate indicates the current error value, and the abscissa indicates the input current signal. The reference signal is applied to the IO of the abscissa. Moreover, this embodiment is characterized in that e2<e1 (although e1=e2 in the prior art) when the segment having a constant gradient a across the reference signal IO is designated by L1, as shown, when the current error limit value on the right side (where the input current is higher than the reference signal) is designated by e1, and when the current error limit value on the left side (where the input current is lower than the reference signal) is designated by e2.

As a result, a high signal is obtained without any limit when a higher input current signal than the reference signal IO comes, so that the control is accelerated. When a lower input current signal than the reference signal IO comes, on the other hand, the current error signal is limited to e2 so that the control is decelerated. Thus, a hunting (or fluctuation) hardly occurs.

According to this method, as described above, a quick control is also made for avoiding a danger when the input current is over the reference, but is not made because of no danger when the input current is under the reference, so that the hunting trouble, as might otherwise be caused by the quick response, can be reduced.

(Embodiment 8)

Embodiment 8 of the invention is constructed to add such a Vc limiter function to the current control output as to control the collector voltage Vc of the switching transistor to a predetermined value.

FIGS. 7A and 7B are diagrams for explaining the construction according to Embodiment 8 of the invention for adding the Vc limiter function to the current control output. FIG. 7A is a construction diagram, and FIG. 7B is a specific circuit example. In FIG. 7A, the comparator circuit 74 of FIG. 1 is fed at its one input terminal with the input current signal from the smoothing circuit 73 (FIG. 1) and at its other input terminal with the current reference signal from the output setting unit 75. The comparator circuit 74 outputs the difference between the input current signal and the current reference signal as the current error from its output terminal. According to Embodiment 8 of the invention, a function, as indicated by dotted lines in the lower portion of FIG. 7A is added to the circuit shown in FIG. 1.

In FIG. 7A, another comparator circuit 740 is provided according to Embodiment 8. In this comparator circuit 740, a comparator 745 is fed at its one input terminal 742 with the collector voltage signal Vc of the switching transistor and at its other input terminal 743 with the applied voltage at the unoscillation of the magnetron as a voltage reference signal V2. From the comparator 745, the difference between the voltage signal Vc of the input terminal 742 and the voltage reference signal of the input terminal 743 is outputted to an output terminal 744 and is added to the output of the aforementioned comparator circuit 74 thereby to produce an error signal.

FIG. 7B shows a specific circuit example of the comparator. The comparator circuit 74 is composed of two transistors T1 and T2, and the comparator circuit 740 according to this embodiment is composed of two transistors T3 and T4. These individual transistors T1 to T4 are fed with the signals of the current reference, the input current, the voltage signal Vc and the voltage reference, respectively. Each time the input current exceeds the current reference or each time the voltage signal Vc exceeds the voltage reference, an output is so produced at the two ends of a resistor R5 as to act as the current error signal. When the two comparator circuits act, the synthesized output is so produced at the two ends of the resistor R5 as to act as the current error signal.

Till the magnetron is so sufficiently heated at its cathode that it can oscillate, it exhibits characteristics like those of a high resistance but unlike those shown in FIGS. 13A to 13C. While the switching transistor 39 is being activated for feeding the current from the tertiary winding 42 of the transformer (FIG. 1) to the filament till the oscillation is available (as will be called the "unoscillation time"), therefore, the voltage to be applied to the primary winding 38 of the transformer 41 is limited to prevent an overvoltage from being applied to the magnetron.

At the unoscillation time of the magnetron, the voltage V2 is used as the voltage reference signal and is compared with the collector voltage signal Vc of the switching transistor 39, so that the Vc limiter function to control the collector voltage Vc of the switching transistor 39 to the predetermined value is added to the current control output thereby to simplify the circuit. At the oscillation time of the magnetron, that voltage reference signal is switched a voltage V1 higher than the voltage V2 so that it is substantially ineffective.

(Embodiment 9)

In Embodiment 9 of the invention, the high-frequency component of the differential information is cut to the control input signal of the gain-variable amplifier. As a result, the stability is improved.

Of FIGS. 8A and 8B showing Embodiment 9 of the invention, FIG. 8A is a block diagram, and FIG. 8B shows one example of a high-frequency component cut filter 910 of FIG. 8A.

Embodiment 9 of the invention is characterized, as shown in FIG. 8A, by providing such a high-frequency component cut filter 910 on the amplifier input side and inside or outside of the gain-variable amplifier as cuts the high-frequency component of the output (or the waveform error) emanating from the waveform error detecting circuit 92. This high-frequency component cut filter 910 is constructed of a π type filter, in which a resistor 911 is interposed between capacitors 912 and 913, as shown.

Thus, the waveform error signal from the waveform error detecting circuit 92 is cleared of the high-frequency component, and the gain variability is not adversely influenced by the noise of the waveform error signal, so that the reference current waveform is stabilized against the waveform error. Moreover, the strength against the disturbance is improved.

(Embodiment 10)

In Embodiment 10 of the invention, there is provided reference signal converting means for approaching the reference waveform signal to zero when the commercial power source voltage is in a lowering phase.

FIGS. 9A to 9C are diagrams for explaining a reference signal converting circuit to be used in this embodiment. FIG. 9A is a block diagram; FIG. 9B shows one example of the reference signal converting circuit of FIG. 9A; and FIG. 9C is a waveform diagram, in which (1) shows a reference waveform, and (2) shows a waveform error signal.

In FIG. 9A, numeral 620 designates the reference signal converting circuit, which is interposed between the shaping filter 62 and the gain-variable amplifier 91 and acts to approach the reference waveform signal to zero when the commercial power source voltage is in the lowering phase (near 0 degrees or near 180 degrees).

In FIG. 9B, the reference signal converting circuit 620 is constructed such that a transistor Tr62 is connected between a Vcc power source and the input terminal of the gain-variable amplifier 91, such that a DC voltage V62 is interposed between the base and the earth of the transistor Tr62, and such that a resistor R62 is inserted upstream of the node between the emitter of the transistor Tr62 and the input terminal of the gain-variable amplifier 91.

When an AC full wave rectified waveform Vs arrives at the input terminal of the gain-variable amplifier 91, the transistor Tr62 is turned OFF when the voltage of the waveform Vs is higher than the predetermined value V2, so that the full-wave rectified waveform is obtained as it is.

When the voltage of the waveform Vs becomes lower than the predetermined value V2, however, the transistor Tr62 is turned ON so that the voltage Vcc is applied to the input terminal side. Therefore, the waveform lower than the value V2 does not appear so that the waveform is raised by the predetermined low potential. When the level of this waveform is shifted to adjust the low potential portion to 0, it is then possible to obtain a desired waveform Vs'.

In FIG. 9C, (1) is an enlarged diagram of that waveform Vs'. In the phase (near 0 degrees or near 180 degrees) of the low commercial power source voltage, the reference waveform signal is approaching to zero. The control operations are stabilized by using such waveform. This is because no current can be intrinsically fed to the magnetron in the phase (near 0 degrees or near 180 degrees) of the commercial power source voltage so that the waveform error signal need not be unnaturally fed. Therefore, the reference waveform signal is set to zero in the phase of the low commercial power source voltage so that the action to feed the waveform error signal thereby to unstabilize the control is eliminated. In FIG. 9C, (2) is shows the waveform error signal according to the method of the prior art. In the phase (near 0 degrees or near 180 degrees) of the low commercial power source voltage, as shown, the actions are easily unstable to enlarge the amplitude value C1 of the error signal. According to this embodiment, the portions at the value C1 are cut, as hatched, so that the actions are stabilized.

(Embodiment 11)

In Embodiment 11 of the invention, the shaping filter circuit is constructed by providing the aforementioned shaping circuit 62 with a band-pass filter 621 as an example of the filter for attenuating the higher harmonic distortion component of the commercial power source frequency.

Of FIGS. 10A and 10B are diagrams for explaining Embodiment 11 of the invention, FIG. 10A is a circuit diagram, and FIG. 10B is a gain-frequency characteristic diagram.

In FIG. 10A, the band-pass filter 621 is provided in the shaping circuit 62 according to Embodiment 11 of the invention, and attenuates the high-order component exceeding the commercial power source frequency.

FIG. 10B shows the gain-frequency characteristics of the band-pass filter 621. The high-order higher harmonic distortion component of the commercial power source frequency is cut, but the higher harmonic distortion component of the low-order component is hardly attenuated. As a result, the low-order distortion component of the commercial power source frequency is left. As has been described in Embodiment 2, therefore, the power factor is better than that of the sine wave reference signal method of common use employing the microcomputer, and the distortion component or noise of the high order is cut so that the operations are stabilized against the disturbance.

(Embodiment 12)

In Embodiment 12 of the invention, the phase of the reference waveform of the aforementioned Embodiment 2 is advanced in advance while considering the delay time of the control system. By this advancement, the power factor is improved. Of FIGS. 11A and 11B for explaining Embodiment 12 of the invention, FIG. 11A is a circuit diagram, and FIG. 11B is a diagram for explaining the phase advancement of the reference waveform.

In FIG. 11A, reference numeral 622 designates one example of the filter circuit according to Embodiment 12 of the invention. In this filter circuit 622: resistors R61 and R62 and a capacitor C61 construct a high-pass filter for cutting the low-range component; resistors R63 and R64 and a capacitor C62 construct a low-pass filter for cutting the high-range component; and the resistors R61 and R62 construct a DC bias.

In the filter thus constructed, the band-pass filter having gain-frequency characteristics of FIG. 11B is provided by setting the cut-off frequency of the low-pass filter higher than the power source frequency and by setting the cut-off frequency of the high-pass filter lower than the same.

In the phase-frequency characteristics of FIG. 11B, moreover, the abscissa indicates the frequency of a signal to be inputted to the filter, and the ordinate indicates the according phase change of an output signal. The low-pass filter is a phase delaying circuit, and the high-pass filter is a phase advancing circuit. As shown, therefore, the phase is delayed for a frequency higher than the power source frequency and is advanced for a frequency lower than the power source frequency. However, the aforementioned cut-off frequency is set such that the frequency for the phase to cross the 0 degrees may be slightly higher than the power source frequency. As a result, the phase of the reference signal in the power source frequency is advanced by an advancement quantity of $\Delta\Phi$, as shown.

With a small delay, therefore, the control system follows the reference signal, which is advanced in phase with respect to the power source voltage, so that the phase of the input current waveform accords to that of the power source voltage thereby to provide a high power factor.

According to the invention, as has been described hereinbefore; the input current of an inverter circuit for rectifying the voltage of an AC power source to convert the rectified voltage into an AC voltage of a predetermined frequency is detected; the detected current is rectified to determine an input current waveform; the waveform is shaped to determine a reference waveform; the difference between the input current waveform and the reference waveform is determined; and the differential information and the current control output is mixed by a mix circuit to convert the mixed one into the drive output of a switching transistor of the inverter circuit. As a result, the control loop acts such that the input current waveform accords to the waveform reference following the waveform of the input voltage and the magnitude of the input current. Therefore, the input current waveform can be shaped without being influenced by either a fluctuation, if any in the kind or characteristics of the magnetron, or a fluctuation in the ebm (i.e., the anode-cathode voltage) due to the temperature of the anode of the magnetron or the load in the microwave cooker or a fluctuation in the power source voltage.

What is claimed is:

1. A high-frequency dielectric heating power control method providing
   a current detecting means to detect an input current of an inverter circuit for rectifying an AC power source voltage for a high-frequency switching to convert the rectified voltage into a high-frequency power and a mix circuit said method comprising the steps of:
   determining an input current waveform from said input current;
   determining a reference waveform from said AC power source voltage;
   determining a difference between said input current waveform and said reference waveform to determine a waveform error signal;
   mixing said waveform error signal and a current error signal; and
   converting said waveform error signal and said current error signal into a drive signal of a switching transistor of said inverter circuit.

2. A high-frequency dielectric heating power control method according to claim 1, wherein said detected input current of the inverter circuit is rectified to form the input current waveform; and said AC power source voltage is rectified and shaped to determine the reference waveform.

3. A high-frequency dielectric heating power control method according to claim 1, wherein said reference waveform is determined by converting said AC power source voltage waveform through a gain-variable amplifier.

4. A high-frequency dielectric heating power control method according to claim 3, wherein said waveform error signal is used as a control input signal of said gain-variable amplifier.

5. A high-frequency dielectric heating power control method according to claim 1, wherein said mix circuit is constructed to cut a high-frequency component of said current error signal.

6. A high-frequency dielectric heating power control method according to claim 1, wherein the reference waveform is inputted as an auxiliary modulation signal to said mix circuit.

7. A high-frequency dielectric heating power control method according to claim 1, wherein a limiter for limiting said waveform error signal in a plus direction and in a minus direction is provided to input said mix circuit.

8. A high-frequency dielectric heating power control method according to claim 1, wherein the current error signal is determined by a difference between current rising and falling characteristics of a smoothed current signal and a current reference signal.

9. A high-frequency dielectric heating power control method according to claim 1, wherein a limiter function to control a collector voltage of said switching transistor to a predetermined value is added to said current error signal.

10. A high-frequency dielectric heating power control method according to claim 1, wherein a high-frequency component of said waveform error signal is cut to a control input signal of a gain-variable amplifier.

11. A high-frequency dielectric heating power control method according to claim 1, wherein reference signal converting means is provided for approaching said reference waveform signal to zero in a phase where said AC power source voltage is low.

12. A high-frequency dielectric heating power control method according to claim 1, wherein a shaping filter circuit for rectifying said AC power source voltage is provided with a filter for attenuating a higher harmonic distortion frequency component of the said AC power source voltage.

13. A high-frequency dielectric heating power control method according to claims 1, wherein the phase of said reference waveform is advanced by considering the delay time of said high-frequency dielectric heating power control system.

14. A high-frequency dielectric heating power control device comprising:

current detecting means for rectifying an AC power source voltage for a high-frequency switching to convert the rectified voltage into a high-frequency power;

first waveform converting means for converting the output of said current detecting means into an input current waveform;

second waveform converting means for converting said AC power source voltage into a reference waveform;

a waveform error detecting circuit for determining a difference between the input current waveform from said first waveform converting means and the reference waveform from said second waveform converting means, to output a waveform error signal; and drive signal converting means for mixing and converting said waveform error signal and current error signal into a drive signal of a switching transistor of an inverter circuit.

15. A high-frequency dielectric heating power control device comprising:

current detecting means for rectifying an AC power source voltage for a high-frequency switching to convert the rectified voltage into a high-frequency power;

a first rectifying circuit for rectifying a current signal from said current detecting means to determine an input current waveform;

a second rectifying circuit for rectifying said AC power source voltage;

a shaping circuit for shaping a waveform output of said second rectifying circuit;

a gain-variable amplifier circuit for varying the gain of said waveform from said shaping circuit to output a reference waveform; and a waveform error detecting circuit for outputting a waveform error signal from a difference between the input current waveform from said first rectifying circuit and said reference waveform from said gain-variable amplifier circuit.

16. A high-frequency dielectric heating power control device according to claim 15, further comprising: drive signal converting means for mixing and converting said waveform error signal and a current error signal into a drive signal of a switching transistor of an inverter circuit.

17. A high-frequency dielectric heating power control device according to claim 14, wherein said second waveform converting means includes a gain-variable amplifier to obtain said reference waveform by converting said AC power source voltage waveform.

18. A high-frequency dielectric heating power control device according to claim 17, wherein said waveform error signal is used as a control input signal of said gain-variable amplifier.

19. A high-frequency dielectric heating power control device according to claim 14, wherein drive signal converting means includes a mix circuit to cut a high-frequency component of said current error signal.

20. A high-frequency dielectric heating power control device according to claim 14, further comprising inverting-and-shaping circuit for inverting a signal, which is shaped by rectifying said AC power source voltage, and inputting as an auxiliary modulation signal to said drive signal converting means.

21. A high-frequency dielectric heating power control device according to claim 14 further comprising a mix circuit, wherein said drive signal converting means includes a limiter for limiting said waveform error signal in a plus direction and in a minus direction is provided to input said mix circuit.

* * * * *

UNITED STATES PATENT AND TRADEMARK OFFICE
CERTIFICATE OF CORRECTION

PATENT NO. : 6,903,319 B2
DATED : June 7, 2005
INVENTOR(S) : Suenaga et al.

It is certified that error appears in the above-identified patent and that said Letters Patent is hereby corrected as shown below:

Column 5,
Line 4, delete "wherethe" and insert therefor -- where the --.

Column 10,
Line 35, delete "by a" and insert therefor -- by $\alpha$ --.
Line 41, delete "to a" and insert therefor -- to $\alpha$ --.
Line 62, delete "a across" and insert therefor -- $\alpha$ across --.

Column 11,
Line 19, delete "78" and insert therefor -- 7B --.

Column 15,
Line 49, after "component of", delete "the".

Column 16,
Line 7, after "signal and", insert -- a --.

Signed and Sealed this

First Day of November, 2005

JON W. DUDAS
*Director of the United States Patent and Trademark Office*